Oct. 24, 1961     J. W. SMITHSON     3,005,347
SAMPLING APPARATUS
Filed Aug. 8, 1958     2 Sheets-Sheet 1
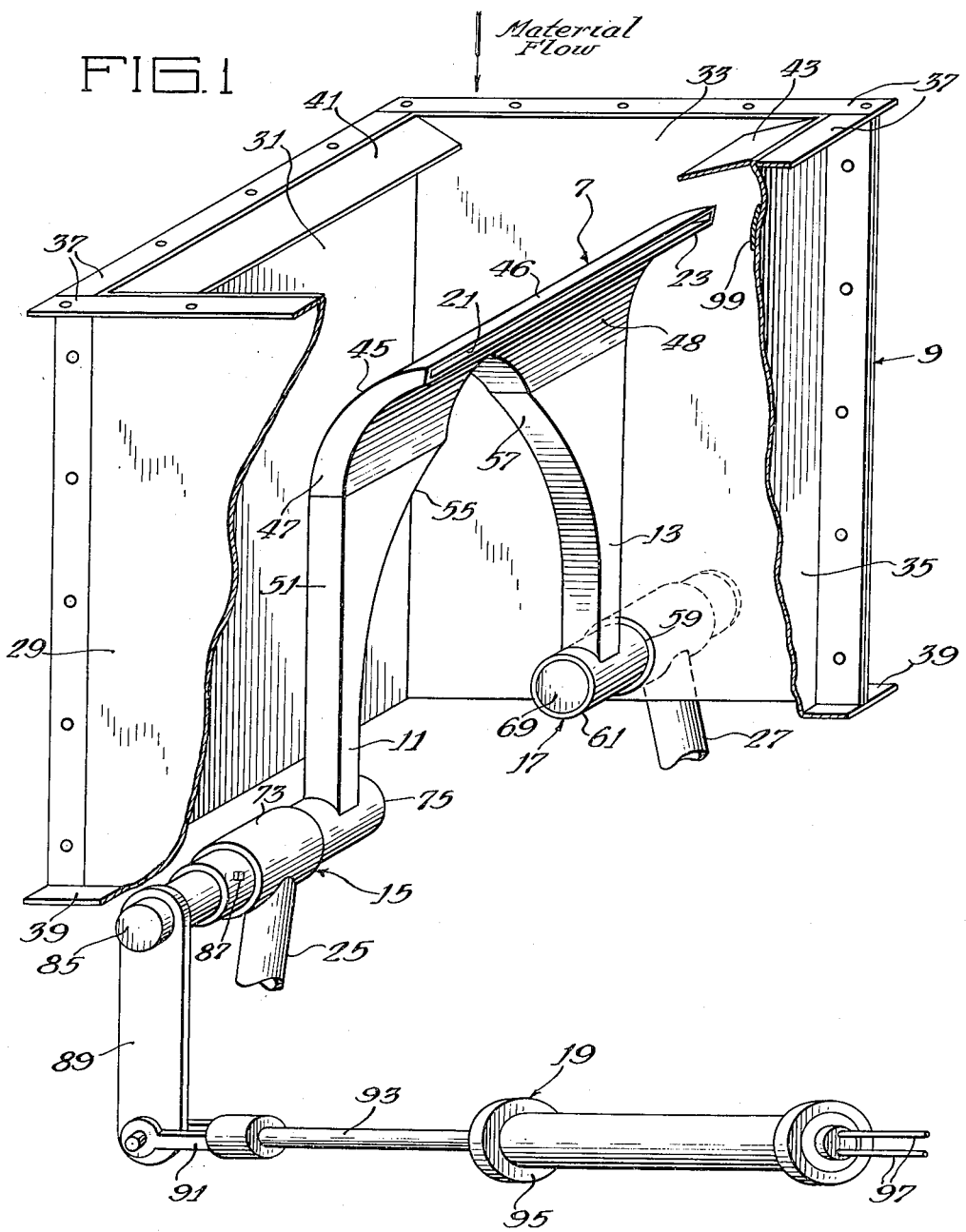
Inventor:
James W. Smithson
By Ernest V. Haines
Attorney

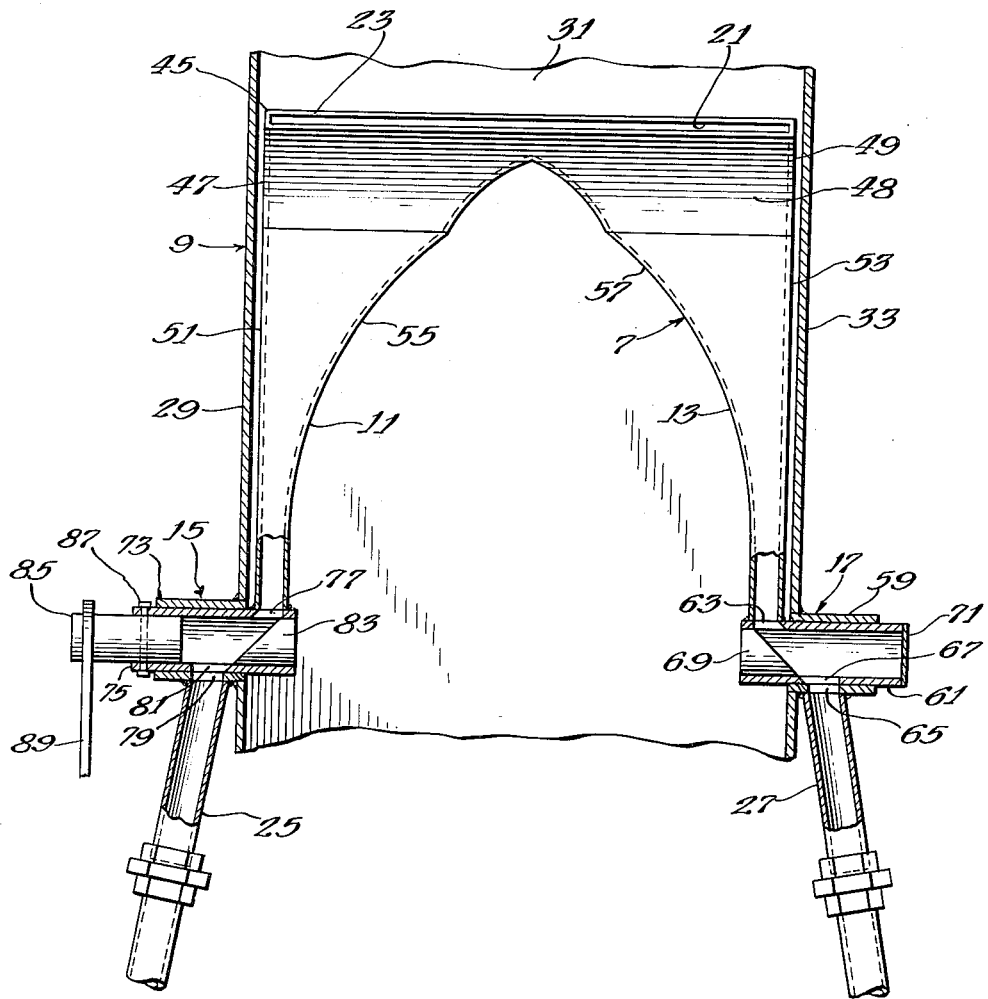

United States Patent Office 3,005,347
Patented Oct. 24, 1961

3,005,347
SAMPLING APPARATUS
James W. Smithson, Carlsbad, N. Mex., assignor to International Minerals & Chemical Corporation, a corporation of New York
Filed Aug. 8, 1958, Ser. No. 753,960
4 Claims. (Cl. 73—423)

The present invention generally relates to a sampling apparatus for sampling solid materials and more particularly relates to a sampling apparatus for sampling granular materials such as ores, ore concentrates, minerals, grain, mash, meal, animal feed, fertilizers, etc. It still more particularly relates to a sampling device for sampling a stream of granular material flowing through a chute.

In the sampling of granular materials, for example comminuted ores, it has generally been possible to achieve satisfactory sampling when the material is in a bin or hopper or other storage means. However, when the granular material is flowing through a conduit, chute, or duct, it is difficult to sample the material in such a manner that a representative sample is taken. Further, when the granular material is in finely divided form, such as a dust, it is exceedingly difficult to take a representative sample of the flowing stream since loss by aeration of the dust is frequently encountered.

Accordingly, it is an object of the present invention to provide an apparatus for sampling solid materials.

It is another object of the present invention to provide an apparatus for sampling granular materials such as ores, ore concentrates, minerals, grain, mash, meal, animal feed, fertilizers, etc.

It is a further object of the present invention to provide an apparatus for taking a representative sample of granular solid material passing through a chute.

It is a specific example of the present invention to provide an apparatus for taking a representative sample of granular solid material flowing downwardly through a substantially vertical chute, the apparatus including a moveable sampling arm which cuts through the flowing material without substantially interrupting the flow through the chute.

Further objects and advantages of the present invention will be apparent from the following description and accompanying drawings which illustrate one form of the invention.

In the drawings:

FIGURE 1 is a perspective view of a sampling apparatus embodying various features of this invention, with part of the apparatus illustrated in broken section; and FIGURE 2 is a front elevational view, partially in section, of the apparatus shown in FIGURE 1.

The present invention provides an apparatus for taking a sample of solid granular material flowing downwardly through a vertical chute. The apparatus of the present invention provides a unique sampling arm which moves through the stream of flowing material.

The apparatus of the present invention includes a sample inlet slot in the sampling arm. The apparatus also provides for moving the sampling arm through the stream of flowing material in a manner that some of the material enters the sample inlet slot. The apparatus then provides for conducting the sample of material through the sampling arm and to a suitable point outside the apparatus where the sample may be analyzed. The apparatus is a sealed unit and therefore no dust losses are encountered. The apparatus is readily adaptable to a semi-continuous method of sampling, as will hereinafter become apparent as the description of the invention progresses.

The use of the apparatus makes possible the sampling of flowing granular material with a minimum of difficulty. The granular material may be sampled semicontinuously and it is not necessary to substantially interrupt the flow of the material when taking the sample.

An embodiment of the apparatus of the present invention is shown in the drawings and is described in the following paragraphs, while the sampling machine shown in the drawings is specifically adapted for the sampling of granular mineral particles, it will be understood that the apparatus may be used for the sampling of other materials with equal facility.

As will hereinafter become apparent, the sampling apparatus shown in the drawings includes generally a bifurcated sampling arm 7 which is positioned in a chute or housing 9. In this embodiment the flow of material, as indicated in FIGURE 1, is downward through the chute 9. Each of the legs, 11 and 13, of the bifurcated sampling arm 7 is mounted on a hub assembly, 15 and 17, respectively, so that the sampling arm 7 may be pivoted on the hub assemblies by suitable means 19. The sampling arm 7 is of hollow construction and has a sample inlet opening 21 at its leading face 23. In operations as the sampling arm 7 is pivoted in a manner that the leading face 23 is moving into the stream of solid granular material descending through the chute 9, the granular material enters the sample inlet opening 21 and moves downwardly through the legs 11 and 13 of the sampling arm 7. The hub assemblies 15 and 17 also have passageways therein which permit the granular material in the legs to pass through the hub assemblies 15 and 17. The sample of granular material passes through the hub assemblies, 15 and 17, and is conducted away by conduits 25 and 27 respectively. The sample of material removed in this manner has been found to be representative of the material flowing through the chute 9.

Referring now more particularly to the drawings, the specific sampling machine illustrated embodies various of the features of the invention and, as has been pointed out, is particularly adapted to the sampling of granular mineral particles. The illustrated apparatus includes a substantially vertical enclosed chute or duct or conduit 9 of fabricated construction which is also the housing for the apparatus. The chute 9 shown is of rectangular section and has four vertical walls 29, 31, 33, and 35. Instead of being of rectangular shape, the chute may have a square, round, or oval or other suitable cross section. The upper edges of walls 29, 31, 33, and 35 are provided with flanges 37, and similarly the lower edges of the walls are provided with flanges 39. This construction enables the chute or housing 9 to be easily placed in a line through which material is to flow, and this construction also provides for ready accessibility to the interior of the housing 9. A deflector plate 41 is secured to the top of wall 31 and this plate is inclined downwardly to the interior of the housing 9 so as to direct material inwardly. A deflector plate 43 is similarly provided at the top of wall 35.

The sampling arm 7 is of bifurcated construction and has two similar legs 11 and 13. The sampling arm including the legs is tubular or hollow. The upper portion 45 of the sampling arm extends between the opposite walls 29 and 33 (FIG. 2) and terminates adjacent these walls. The upper portion 45 has an upper wall 46 and a lower wall 48, which are curved and meet with the legs 11 and 13 substantially tangentially. The outer side walls 47 and 49 of the upper portion 45 are substantially vertical and meet with the vertical side walls 51 and 53 respectively of the legs 11 and 13 respectively. The upper wall 46 and the lower wall 48 of the upper portion 45 are curved through a substantially 90° arc and terminate in a flat substantially vertical surface or face 23, which is substantially parallel to the main direction of material flow through the chute 9. The sampling arm 7 has a substantial radius, that is, there is a substantial distance from the axis of rotation of the hub assemblies to the slot 21 so that when the sampling arm 7 is pivoted on the hub assemblies 15 and 17, the flat face or leading edge 23 moves substantially perpendicular to the main direction of material flow through the chute 9.

The flat face or leading edge 23 has the sample inlet opening 21 therein. The sample slot or opening 21 extends substantially from vertical wall 47 to vertical wall 49; that is, the sample slot 21 extends substantially the entire distance between the opposite walls 29 and 33 of the chute 9 so that when the sampling arm 7 is moved through the descending stream of material, material from one wall 29 to the other wall 33 enters the slot 21. In this manner a representative sample of material passing between the walls 29 and 33 is taken. The width of the slot 21, measured perpendicular to the dimension from wall 47 to wall 49 is greater than the average particle size of the material to be sampled and is preferably at least 5 times as great and still more preferably at least 10 times as great. In order to prevent clogging of the sample slot 21, the width should at least be greater than the size of the largest particle in the material to be sampled. In a commercial embodiment the slot measured 16¼" x 5/16".

The bifurcation begins in the upper section 45 of the sampling arm 7 about a line connecting the upper wall 46 and the lower wall 48, which line is midway between the vertical walls 47 and 49. The interior walls 55 and 57 of the sampling arm diverge from this line and are inclined downwardly and outwardly toward the respective vertical walls 51 and 53. Material entering the sample slot 21 therefore splits and substantially half of the material passes down through hollow leg 11 and the other half passes down through hollow leg 13. It should be noted that any material which enters the sampling slot 21 moves downwardly, as no substantially horizontal surfaces are present on which sampled material could collect. The interior walls 55 and 57 diverge widely from the bifurcation, thereby leaving open an extensive area between the legs 11 and 13. This construction reduces the obstruction that the sampling apparatus gives to the flow of material through the chute 9.

The lower ends of the hollow legs 11 and 13 are attached to and extend laterally from the hub assemblies 15 and 17 respectively. Hub assembly 17 includes a bearing 59 which is welded to wall 33 of the chute 9 so as to extend outward from the chute 9. A tubular cylindrical shaft 61 is rotatably mounted in the bearing 59 and extends through the bearing into the housing 9. The hollow leg 13 is attached as by welding onto the upper cylindrical wall of the tubular shaft extending into the housing. A hole or opening 63 is provided in the wall of the tubular shaft to provide a passageway connecting the interior of the hollow leg 13 with the interior of the tubular shaft 61 so that material in the hollow leg may pass into the interior of the tubular shaft. Conduit 27 is welded to an underside of the bearing 59 and a hole 65 is provided in the bearing coinciding with the opening into the conduit. A hole 67 is also provided in the underside of the tubular shaft. The hole 67 in the tubular shaft 61 is larger than the hole 65 in the bearing so that as the tubular shaft pivots there is always a passageway from the interior of the tubular shaft 61 into the conduit 27. An obliquely truncated right cylindrical plug 69 is placed in the tubular shaft so that the oblique surface is inclined downward and outward of the chute 9. The shorter length of the plug 69 terminates adjacent the opening 63 and the longer length of the plug terminates adjacent the opening 67 so that material passing through the opening 63 passes onto the oblique surface of the plug and is guided downwardly to opening 67. A flat plate cover 71 covers the outer end of the tubular shaft. It should be noted that with the construction shown in the drawings and described above, the movement of material from the sampling slot 21 to the conduit 27 is continuously downward.

Hub assembly 15 is similar to hub assembly 17. Hub assembly 15 includes a bearing 73 welded to wall 29 so as to extend outward from the housing 9. A tubular cylindrical driving shaft 75 is rotatably mounted in the bearing 73 and extends through the bearing into the housing. The hollow leg 11 is attached, as by welding, onto the upper cylindrical wall of the tubular shaft extending into the housing. A hole or opening 77 is provided in the wall of the tubular shaft to provide a passageway connecting the interior of the hollow leg 11 with the interior of the tubular drive shaft 75 so that material in the hollow leg may pass from the interior of the hollow leg into the interior of the tubular drive shaft. Conduit 25 is welded to an underside of the bearing 73 and a hole 79 is provided in the bearing coinciding with the opening into the conduit 25. A hole 81 is also provided in the underside of the tubular drive shaft 75. This hole is larger than the hole 79 so that as the sampling arm pivots there is always a passageway from the interior of the tubular drive shaft 75 into the conduit 25. An obliquely truncated right cylindrical plug 83, similar to plug 69 closes the interior end of the tubular drive shaft 75.

A solid drive shaft 85 is inserted into the exterior end of the tubular drive shaft 75 and the two shafts 85 and 75 are drivingly connected through a shear pin 87. The solid drive shaft 85 is connected to the means 19 for rotating or pivoting the shaft 85 back and forth so that the sampling arm 7 may pivot back and forth or oscillate about the axis of rotation of the hub assemblies 15 and 17. Any suitable means for rotating the solid drive shaft back and forth about its axis of rotation may be used. In the illustrated embodiment, the solid drive shaft is attached to an upper end of a lever arm 89 and the lower end of the lever arm is pivotally attached to a bifurcated connector 91. The radius of the sampling arm 7, measured from the axis of rotation of the hub assemblies to the sampling slot 21, is substantially greater than the distance from the axis of rotation of the hub assemblies to the wall 31 or the wall 35. The sampling slot 21 therefore moves predominantly horizontally, that is, substantially perpendicular to the main direction of flow of the material through the chute 9.

The bifurcated connector 91 in turn is attached to a piston rod 93 of an air cylinder 95. The air cylinder 95 is of a standard commercially available type and operates to move the piston rod 93 inwardly and outwardly of the cylinder in response to changes in the air supplied to the cylinder through air lines 97.

Timing of the movement of the sampling arm 7 may be accomplished by known mechanisms. The length of stroke of the piston rod 93 should be such that the sampling arm 7 in its backwardmost position is adjacent the back wall 31 of the housing 9 and in the forwardmost position the sampling arm 7 is adjacent the front wall 35 of the housing. An elongated rubber bumper 99 is provided on the interior of the front wall 35 so that the forward face 23 of the sampling arm rests against this bumper when the sampling arm is in its forwardmost position, thereby closing the sampling slot 21. As the sampling arm 7 moves from its backwardmost position adjacent wall 31 to its forwardmost position adjacent wall 35, the sample splot 21 will take a cut of material descending through the chute 9 which will be a representative sample of the material.

The described oscillatory sampling apparatus may be readily installed in any size vertical chute, round, square, oval, or other shape, and requires a minimum of space. The sampling arm 7 cuts a cross section substantially perpendicular to the flow of material through the chute 9, thereby forcing a cross-sectional cut of the entire stream into the sample slot.

The sampling apparatus is sealed within its housing 9 and the sample of material passes through the hub assemblies into a suitable sample receiver (not illustrated) through a closed sampling circuit which eliminates contamination and loss through aeration of dust.

The description of the invention utilized specific reference to certain construction details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

What is claimed is:

1. A sampling apparatus for sampling a flowing stream of granular material which comprises a substantially vertical chute, a hollow bifurcated sampling arm positioned within said chute with each of the hollow legs of said hollow bifurcated arm pivotally mounted on a hub assembly, said hub assemblies secured to substantially opposite walls of said chute, said hollow legs extending upwardly from said hub assemblies and terminating in an upper portion of said hollow arm, a sampling slot in said upper portion of said sampling arm through which granular material may enter said hollow sampling arm, and means for pivotally moving said sampling arm on said hub assemblies.

2. A sampling apparatus for sampling a flowing stream of granular material which comprises a substantially vertical chute, a hollow bifurcated sampling arm positioned within said chute with each of the hollow legs of said hollow bifurcated arm pivotally mounted on a hub assembly, said hub assemblies secured to substantially opposite walls of said chute, said hollow legs extending upwardly from said hub assemblies and terminating in an upper portion of said hollow arm, said upper portion extending substantially across the distance between said opposite walls, a sampling slot in said upper portion of said sampling arm through which granular material may enter said hollow sampling arm, said sampling slot extending substantially across the distance between said opposite walls, and means for pivotally moving said sampling arm on said hub assemblies.

3. A sampling apparatus for sampling a flowing stream of granular material which comprises a substantially vertical chute, a hollow bifurcated sampling arm positioned within said chute with each of the hollow legs of said hollow bifurcated arm pivotally mounted on a hub assembly, said hub assemblies secured to substantially opposite walls of said chute, said hollow legs extending upwardly from said hub assemblies and terminating in an upper portion of said hollow arm, said upper portion having a substantially vertical surface extending substantially across the distance between said opposite walls, a sampling slot in said vertical surface through which granular material in said chute may enter said hollow sampling arm, said sampling slot extending substantially across the distance between said opposite walls, and means for pivotally moving said sampling arm on said hub assemblies so that said upper portion is moved in a predominantly horizontal direction.

4. A sampling apparatus for sampling a flowing stream of granular material which comprises a substantially vertical chute, a hollow widely bifurcated sampling arm positioned within said chute with each of the hollow legs of said hollow bifurcated arm pivotally mounted on a hub assembly, said hub assemblies secured to substantially opposite walls of said chute, said hollow legs extending upwardly from said hub assemblies and terminating in an upper portion of said hollow arm, said upper portion having a substantially vertical surface extending substantially across the distance between said opposite walls, a sampling slot in said vertical surface through which granular material in said chute may enter said hollow sampling arm, said sampling slot extending substantially across the distance between opposite walls, means for pivotally moving said sampling arm on said hub assemblies so that said upper portion is moved in a predominantly horizontal direction, and passageways through said hub assemblies in communication with the interiors of said hollow legs through which material being sampled may flow from said hollow legs through said hub assemblies.

References Cited in the file of this patent

UNITED STATES PATENTS

| | | |
|---|---|---|
| 693,690 | Dodd | Feb. 18, 1902 |
| 1,762,253 | Wheeler | June 10, 1930 |
| 2,641,934 | Werts | June 16, 1953 |
| 2,668,447 | Lenhart | Feb. 9, 1954 |